No. 717,219. Patented Dec. 30, 1902.
S. L. G. KNOX.
TRAIN CONTROL SYSTEM.
(Application filed June 5, 1902.)
(No Model.)
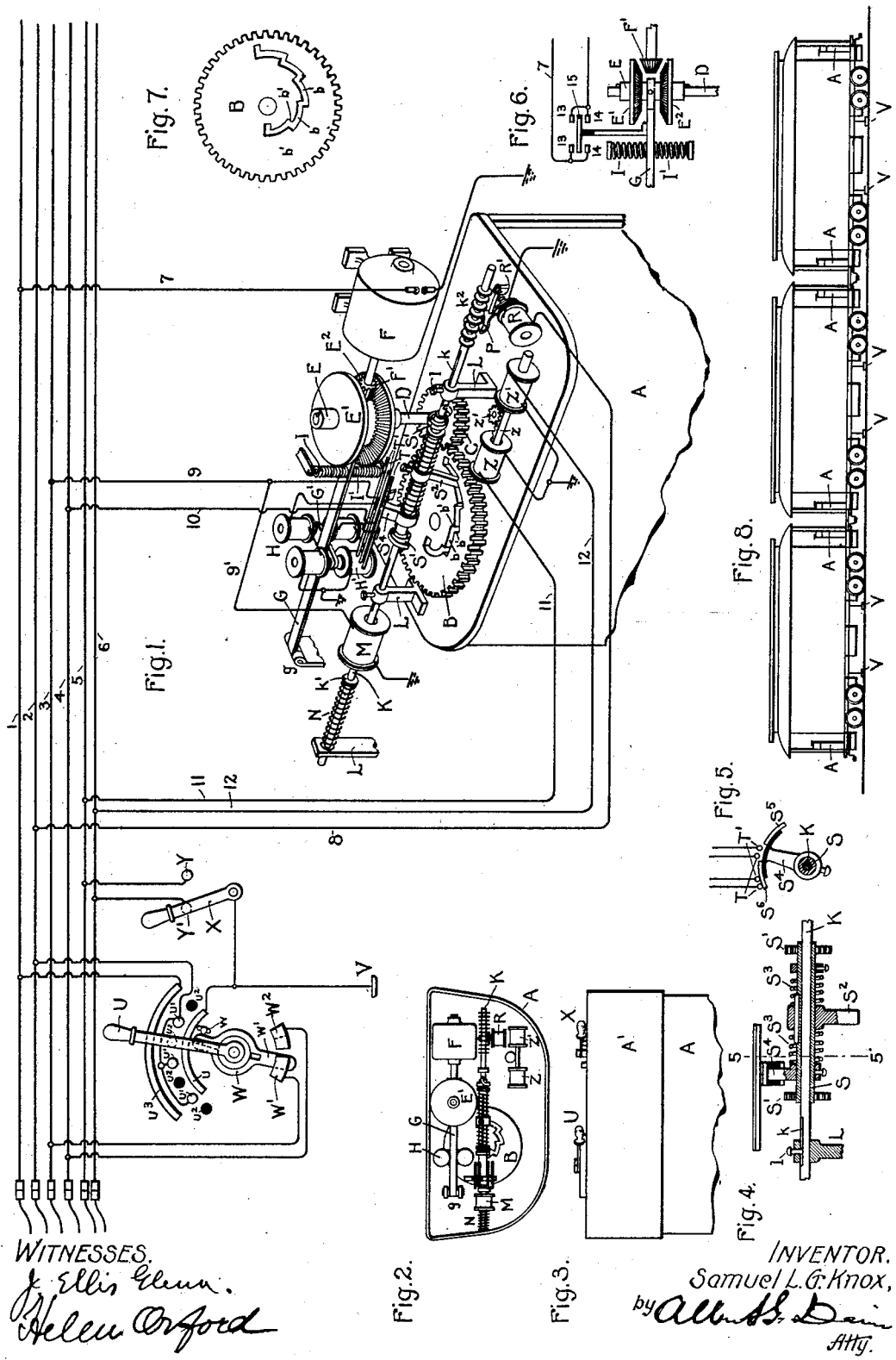
WITNESSES.
INVENTOR.
Samuel L. G. Knox,
by
Atty.

UNITED STATES PATENT OFFICE.

SAMUEL L. G. KNOX, OF MILWAUKEE, WISCONSIN, ASSIGNOR TO GENERAL ELECTRIC COMPANY, A CORPORATION OF NEW YORK.

TRAIN-CONTROL SYSTEM.

SPECIFICATION forming part of Letters Patent No. 717,219, dated December 30, 1902.

Application filed June 5, 1902. Serial No. 110,282. (No model.)

*To all whom it may concern:*

Be it known that I, SAMUEL L. G. KNOX, a citizen of the United States, residing at Milwaukee, county of Milwaukee, State of Wisconsin, have invented certain new and useful Improvements in Train-Control Systems, (Case No. 2,121,) of which the following is a specification.

This invention relates to apparatus whereby a plurality of electric motors, each taking current through its individual controller, can all be simultaneously and similarly controlled by means of one or more controllers located at convenient points. Such a system is of especial value in handling trains of two or more electric cars, and my invention will therefore be described in its application to electric-train control.

The several cars of the train are each equipped with the usual motors and standard controllers. At each controller I provide certain mechanism which actuates the controller either forward or backward, as desired, and automatically stops such actuation after the controller-cylinder has turned a predetermined number of steps. As this automatic action is positive in its nature and is regulated by a master-controller, it follows that if any number of actuating mechanisms and car-controllers are connected in multiple with said master-controller all of them will operate exactly alike, and hence all the motors which are in circuit with the controllers will be similarly regulated.

My present invention will be better understood by reference to the following description, taken in connection with the accompanying drawings, which illustrate the best mode in which I have contemplated applying the principles thereof. In the particular embodiment illustrated there is provided at each controller a small electric motor, a shaft carrying bevel-gears and a pinion, the latter meshing with a gear-wheel on the shaft of the car-controller, electromagnets for causing one or the other of the bevel-gears to mesh with a pinion on the motor-shaft, the said electromagnets, together with their associated mechanism, constituting means for operatively connecting the small motor to the movable member of the controller, a stepped spiral slot in the gear-wheel on the car-controller shaft, a rock-arm hanging in said slot, a switch operated by the movable member of the controller through the said rock-arm and controlling the circuits of the electromagnets, a solenoid for moving said arm radially of the gear-wheel, and a let-off actuated by a magnet and operating to control the extent of movement of the arm, and thus to determine the point in the movement of the controller at which the switch shall be operated. When the circuit of one of the electromagnets is closed, it throws one of the bevel-gears into mesh with the motor, which thereupon rotates the shaft and turns the car-controller cylinder through a certain angular distance. Meanwhile a switch at the master-controller has energized the let-off magnet a given number of times, allowing the solenoid to store up energy in a spring sufficient to move the rock-arm radially a given distance as fast as it is permitted to so move by the slowly-turning spiral slot. When the arm reaches its predetermined position, it catches on a shoulder in said slot and is then rocked by the still-turning gear until the switch-arm on the rock-shaft is tilted far enough to open the circuit of the electromagnet, and thus disconnect the bevel-gear from the motor. The car-controller then remains at that point until similarly actuated again either to turn it still farther forward or to bring it back to the "off" position. The reversing-switch of the car-controller is operated by two solenoids, each in a separate circuit and controlled by a simple double-throw single-pole switch.

In the accompanying drawings, Figure 1 is a diagrammatic view of the actuating mechanism and the controlling-circuits, the parts being somewhat spread out for convenience of illustration. Fig. 2 is a top plan view of the controller with the casing removed from the actuating mechanism. Fig. 3 is a front elevation of the upper part of the controller, showing the casing in place. Fig. 4 is a longitudinal section of the rock-shaft arm and switch. Fig. 5 is a cross-section of the same on the line 5 5, Fig. 4. Fig. 6 is a side elevation of the bevel-gears. Fig. 7 is a plan of the slotted gear-wheel. Fig. 8 shows a train of three motor-cars, all equipped with my invention.

The car-controller is of the usual standard type. The shaft of its rotary contact-cylinder projects up through the top of the casing A and is provided with a gear-wheel B, carrying a series of abutments, such as a spiral slot $b$, having a series of offsets or shoulders $b'$, corresponding in number with the steps of the controller. As shown in Fig. 7, the slot is composed of a series of reaches concentric with the axis, but located at successively increasing distances from the center. Between every two reaches is a short radial passage, the sides of which form the shoulders $b'$. Any other equivalent mode of providing the wheel with a series of radially and angularly spaced abutments for the purpose hereinafter described may be substituted for the slot in the wheel. Meshing with the gear-wheel is a pinion C, fast on an upright shaft D, which has splined on its upper portion a sleeve E, carrying two bevel-gears $E'$ $E^2$, whose teeth face each other. Between said bevel-gears projects the shaft of a small shunt-wound electric motor F, carrying a bevel-pinion $F'$, adapted to mesh with either of said bevel-gears, but normally out of mesh with both, as shown in Fig. 6. Engaging with the sleeve E in such a manner as not to prevent its rotation is a lever G, fulcrumed at $g$ and carrying an armature $G'$, which lies between two opposed electromagnets H $H'$. Springs I $I'$ on each side of the lever G keep it normally midway between said electromagnets, with the bevel-gears out of mesh with the pinion $F'$.

Extending across the top of the controller-casing and diametrically above the gear-wheel B is a bar K, guided in bearings L and prevented from rotating therein by studs $l$, entering longitudinal grooves $k$ in said bar. Surrounding the bar at one point is a solenoid M, the armature for said solenoid being secured to said bar. A helical spring N surrounds the bar and abuts between a collar $k'$ on the bar and one of the bearings L. This spring acts in opposition to the pull of the solenoid M. At another point on the rod is a series of collars or buttons $k^2$, and engaging with them is an anchor-escapement or let-off P, adapted to be moved in one direction by an electromagnet R and returned by a spring $R'$. Surrounding the bar above the gear-wheel B is a sleeve S, rotatable on the bar, but held in a normal position by means of coiled springs $S'$ at each end, acting in opposition to each other, one end of each spring being attached to the bar and the other to the sleeve. On the sleeve, but splined so as to rotate with it, is a rock-arm $S^2$, held in a normal position by opposing helical springs $S^3$ on each side of it, but capable of a sliding movement on the sleeve either way from the normal position. The rock-arm depends into the spiral slot $b$ in the gear-wheel B. A switch-arm $S^4$ is secured to the sleeve S and carries at its upper end two insulated contact-segments $S^5$ $S^6$. Adjacent to each segment are two rods T $T'$, parallel with the bar K. When the sleeve S is in its normal position, both segments make contact with their respective rods, which are long enough to permit the full movement of the bar, sleeve, and segments without breaking contact with the latter. Each pair of rods and its bridging-segment is in circuit with its respective electromagnet H $H'$. When the sleeve is rocked, as shown in Fig. 5, one of the segments is carried away from its rods and the circuit of the corresponding electromagnet is broken. The sleeve will be rocked when a shoulder $b'$ of the slot $b$ engages with the rock-arm $S^2$ while the gear-wheel is turning.

The master-controller, which enables the motorman to energize the proper circuits, is shown in Fig. 1. It consists of a switch-lever U, adapted to make contact with a segment $u$, connected with the trolley V, and adapted also to make contact with a series of contact-points $u'$. Intermediate insulated or dead points $u^2$ are provided for the lever to rest on when that portion of the control-circuit connected with the points $u'$ is not to be energized. Adjacent to the points is a contact-segment $u^3$, on which the lever bears constantly except when resting on the first point $u^2$. On the hub of the lever is a sleeve W, clamped by a screw $w$, so as to move with considerable friction on the hub. A contact-blade $w'$ on the hub can make contact with either one of two contact-blocks $W'$ $W^2$.

Running through the car and provided with flexible couplings at each end to connect them with adjacent cars are six conductors 1, 2, 3, 4, 5, and 6. The segment $u^3$ is connected with conductor 1, from which a lead 7 runs to one terminal of the motor F, the other terminal being grounded. The live points $u'$ are connected with conductor 2, from which a lead 8 runs to the let-off magnet R, whose other terminal is grounded. The contact-block $W'$ is connected with conductor 3, from which a lead 9 runs to the pair of rods T $T'$ in circuit with the electromagnet H. A branch lead $9'$ runs to the solenoid M. The contact-block $W^2$ is connected with the conductor 4, from which a lead 10 runs to the pair of rods T $T'$ in circuit with the electromagnet $H'$. The other terminals of both the electromagnets and of the solenoid M are grounded. A double-throw single-pole switch X is connected with the trolley and conveys current to one or the other of two contacts Y $Y'$, the former being connected with the conductor 5 and the latter with the conductor 6. Leads 11 12 connect said conductors, respectively, with two solenoids Z $Z'$, whose armatures are united by a rack $z$, meshing with a pinion $z'$ on the shaft of the reversing-switch of the car-controller.

The operation of my device has been briefly set forth at the beginning of this specification, but may be more fully explained as follows: Let the switch-lever U be supposed to rest on the left-hand dead-point $u^2$, with the blade $w'$ on the contact-block $W^2$. The first movement of the lever toward the right carries the switch U on to the trolley-segment $u$ and the blade $w'$ over to the contact-block $W'$, owing to the friction between the hub of the lever and the sleeve W. This energizes the electromagnet H and throws the bevel-gear $E^2$ into mesh with the motor-pinion $F'$. It also energizes the solenoid M, which instantly exerts a constant pull to the right on the bar K. The frictional connection between the hub of the switch-lever and the sleeve W does not prevent the continued movement of the lever, which now makes contact with the point $u'$ and the segment $u^3$. The first sends current to the let-off magnet R, causing the anchor P to let off one button $k^2$ and allow the solenoid M to move the bar one step to the right. Meanwhile the current sent through the segment $u^3$ has started the motor, and the gears begin to turn the gear-wheel B and the controller-cylinder. The movement of the bar K to the right has pressed the rock-arm against the outside of the slot $b$; but since the side of the slot prevents it from moving with the bar the only result is to compress the left-hand spring $S^3$. As the gear-wheel continues to turn, however, the successive radial passages in the slot allow the spring $S^3$ to push the rock-arm along the sleeve S to its normal position. If the switch-lever has been swung over to the position shown in Fig. 1, the anchor P will have been twice actuated by its solenoid and twice returned by its spring, letting off a button at each actuation. The spring $S^3$ will therefore keep pushing the rock-arm to the right until the fourth concentric reach in the slot $b$ is reached. By this time the spring $S^3$ has ceased to operate and the shoulder $b'$ will catch the rock-arm and swing it forward, as shown in Fig. 1. This rocks the sleeve S and carries the bridging-segment $S^5$ away from its rods T T', thereby breaking the circuit of the electromagnets H, letting the bevel-gear $E^2$ fall out of mesh with the motor-pinion, and thus stopping the rotation of the gear-wheel B and the controller-cylinder. In some instances it may be desirable to open-circuit the motor when the bevel-gears go out of mesh with the pinion in order to prevent damage to the gears when they are again brought into engagement. This can be readily accomplished, as shown in Fig. 6, by providing a break in the lead 7, terminating at each side in two contacts 13 14 and mounting on the lever G a bridging-contact 15, which will close on one pair of contacts or the other when the lever is moved up or down from its normal median position to engage the gears with the pinion. If the car-controller is to be turned another step, it is only necessary to move the switch-handle over to the next point, when the let-off magnet will release another button $k^2$, allowing the solenoid M to move the bar again to the right and carry the rock-arm off the shoulder $b'$ into the next reach of the slot. The springs $S'$ immediately return the sleeve S to its normal position and bring the bridging-segment $S^5$ again in contact with the rods T T', thus closing the circuit of the electromagnet H and again causing the bevel-gear $E^2$ to mesh with the motor-pinion and turn the controller-cylinder. At the end of this step the rock-arm is again tilted and the circuit broken as before, with the same results. To turn the controller-cylinder back to the off position, the switch-lever is moved backward. Its first movement in that direction carries the blade $w'$ over to the contact-block $W^2$, thus deënergizing the solenoid M and sending current through the electromagnet H', which moves the upper bevel-gear $E'$ into mesh with the motor-pinion. The let-off now operates to allow the spring N to pull the bar K to the left, and the rock-arm is tilted backward instead of forward at the proper time, causing the bridging-segment $S^6$ to break the circuit of the electromagnet H'.

As all the actuating mechanisms throughout the train are connected in multiple, it will be seen that they can all be simultaneously and similarly operated from any one of the master-controllers. The latter are preferably mounted on top of the casing A', which incloses the actuating mechanism and fits on top of the controller-casing. The reversing-switch X is also mounted on the casing A', so that the top of each controller-casing presents an appearance very similar to the standard style of controller, and the operation of these handles U and X will be readily understood. Care must be taken, of course, to leave the switch U on the first dead-point $u^2$ and the reversing-switch X in its intermediate position off both the contacts Y Y' when the master-controller is not in use in order that all the circuits may be left deënergized and ready to respond to current sent from another master-controller.

In place of the gearing shown in Fig. 6 I may mount the gears $E'$ $E^2$ loosely on the shaft D, with the pinion F' in mesh with both of them, the lever G being provided with a sleeve splined to the shaft and a clutch mechanism arranged to connect the sleeve to either one of the bevel-gears, or I may use any other suitable gearing for transmitting motion from the motor to the controller.

Obviously the system which I have illustrated in the drawings may be modified as a whole and changes may be made in the constituent elements which go to make up the system without departing from the spirit and scope of my invention, and I aim in the claims hereto appended to cover all such modifications that do not involve a departure from my invention.

What I claim as new, and desire to secure by Letters Patent of the United States, is—

1. The combination with a motor-controller, of a motor, electromagnetic means for operatively connecting the said motor to the movable member of the controller, a switch operated by the movable member of the said controller and arranged to open the circuit of the electromagnetic means, and means for determining the point in the movement of the controller at which the said switch shall be operated.

2. The combination with a motor-controller, of a motor, electromagnetic means for operatively connecting the said motor to the movable member of the controller, a switch operated by the movable member of the said controller and arranged to open the circuit of the electromagnetic means, means for determining the point in the movement of the controller at which the said switch shall be operated, and a master-controller operatively related to said determining means.

3. In combination, a motor-controller, a motor for operating said controller, electromagnets for operatively connecting the motor to the controller, a switch in circuit with said electromagnets, means whereby the said switch will be opened by the movement of the said controller, and a master-controller constructed and arranged to energize said electromagnets and to determine the point in the movement of the controller at which the said switch shall be opened.

4. The combination with a motor-controller, of a motor, electromagnetic means for operatively connecting the said motor to the movable member of the controller, a master-switch for controlling the operation of said electromagnetic means, and a switch operated by the movable member of the said controller and arranged to open the circuit of the electromagnetic means at a predetermined point in the movement of the controller.

5. The combination with a motor-controller, of a motor, means for operatively connecting the motor with the said controller for either direction of rotation, electromagnets for operating the said connecting means, a master-switch for controlling the supply of current to said electromagnets, and a switch operated by the movable member of the motor-controller for opening the circuit of the electromagnets at a predetermined point in the movement of the controller.

6. The combination with a motor-controller, comprising a rotatable contact-cylinder, of a motor, gearing for causing said motor to turn the cylinder in either direction, electromagnetic means for determining the direction of rotation of the cylinder, a master-switch for supplying current to actuate said electromagnetic means, and a switch operated by the rotation of the cylinder for open-circuiting said electromagnetic means at a predetermined point in the movement of the cylinder.

7. The combination with a motor-controller comprising a rotatable contact-cylinder, of a motor driving a bevel-pinion, a shaft carrying two bevel-gears arranged to be operatively connected to the cylinder, electromagnets for causing the pinion to drive the controller-cylinder through either one of the bevel-gears, and a switch operated by the cylinder in its rotation for open-circuiting the electromagnets at a predetermined point in the movement of the cylinder.

8. The combination with a motor-controller comprising a rotatable contact-cylinder, of an electric motor, gearing for connecting said motor with the cylinder, electromagnets for effecting said connection, a switch controlling the circuits of said magnets, a rock-arm for moving the switch, and abutments moving with the cylinder for actuating said rock-arm.

9. The combination with a motor-controller comprising a rotatable contact-cylinder, of a gear-wheel on the shaft of said cylinder containing a spiral slot having a series of shoulders, an electric motor, gears for connecting it with said gear-wheel, electromagnets for effecting said connection, a switch controlling the circuits of said magnets, and a rock-arm projecting into said slot and connected with said switch.

10. The combination with a motor-controller comprising a rotatable contact-cylinder, of a gear-wheel on the shaft of said cylinder containing a spiral slot composed of concentric reaches connected by short radial passages, an electric motor, gears for connecting it with said gear-wheel, electromagnets for effecting said connection, a rocking sleeve, a switch-arm on said sleeve controlling the circuits of said electromagnets, and a rock-arm on the sleeve projecting into said slot.

11. In a motor-controller, the combination with a wheel containing a shouldered spiral slot, of a bar extending across said wheel, a sleeve rotatable on said bar, a switch-arm on said sleeve, a rock-arm slidable on said sleeve and engaging with said slot, and opposed springs on each side of said arm.

12. In a motor-controller, the combination with a wheel containing a shouldered spiral slot, of a bar extending across said wheel, means for moving the bar lengthwise, a sleeve rotatable on the bar, opposing springs holding said sleeve in a normal position, a switch-arm on said sleeve, a rock-arm slidable on the sleeve, and depending into said slot, and opposed springs on each side of said arm.

13. In a motor-controller, the combination with a wheel containing a shouldered spiral slot, of a bar extending across said wheel, means for exerting an endwise pressure on said bar, means for permitting it to move step by step, a rock-arm slidable on said bar and depending into said slot, and springs holding said arm in a normal position.

14. In a motor-controller, the combination with a wheel containing a shouldered spiral slot, of a bar extending across the wheel, a solenoid for moving the bar lengthwise, a spring for returning said bar, means for permitting it to move step by step, a rock-arm slidable on the bar and depending into the slot, and springs on each side of said rock-arm.

15. In a motor-controller, the combination with a wheel containing a shouldered spiral slot, of a bar extending across the wheel, means for exerting a lengthwise pressure on said bar, a series of buttons on said bar, an anchor-escapement engaging with said buttons, a magnet for actuating said anchor, and a rock-arm yieldingly mounted on said bar and depending into said slot.

16. In a motor-controller, the combination with a wheel containing a shouldered spiral slot, of a bar extending across the wheel, a sleeve rotatable on the bar, a rock-arm on the sleeve depending into said slot, a switch-arm on said sleeve, rods parallel with the bar and in contact with said switch-arm, and electromagnets in circuit with said rods.

17. In a motor-controller, the combination with a wheel containing a shouldered spiral slot, of a bar extending across said wheel, a sleeve rotatable on said bar, a rock-arm on the sleeve depending into said slot, a switch-arm on said sleeve carrying two insulated segments, two pairs of rods parallel with said bar, each pair making contact with its respective segment, and electromagnets in circuit with said rods.

18. The combination with a motor-controller, of an electric motor for actuating it, electromagnets controlling the direction of rotation, a switch controlling the curcuits of said magnets, a solenoid for shifting said switch, a magnetic let-off for said switch, a slotted wheel for operating the switch, and a master-controller having circuit connections with the motor, the magnets and the solenoid.

19. In a motor-control system, the combination with two electromagnets, of a switch-lever, a sleeve frictionally held on the hub of said lever, a switch-blade on said sleeve, two contact-blocks coöperating with said blade and each in circuit with its respective magnet, a let-off mechanism comprising an electromagnet, and a series of contact-points all in circuit with said magnet and adapted to be closed upon in succession by said lever.

In witness whereof I have hereunto set my hand this 26th day of May, 1902.

SAMUEL L. G. KNOX.

Witnesses:
E. K. SWIGART,
HARRY B. HAYDEN.